United States Patent [19]

Sunouchi et al.

[11] 4,456,357
[45] Jun. 26, 1984

[54] RELEASE OPERATION DEVICE FOR CAMERA

[75] Inventors: Akio Sunouchi; Masahisa Fujino, both of Tokyo; Ryuji Suzuki, Kanagawa, all of Japan

[73] Assignee: Canon Kabushiki Kaisha, Tokyo, Japan

[21] Appl. No.: 420,623

[22] Filed: Sep. 21, 1982

[30] Foreign Application Priority Data

Oct. 13, 1981 [JP] Japan .................................. 56-163643

[51] Int. Cl.$^3$ ............................................. G03B 17/38
[52] U.S. Cl. ....................................... 354/266; 354/64; 354/269
[58] Field of Search .................. 354/64, 266, 268, 269

[56] References Cited

U.S. PATENT DOCUMENTS

| 3,946,408 | 3/1976 | Taguchi | 354/266 |
| 4,244,591 | 1/1981 | Umetsu | 354/64 |
| 4,281,837 | 8/1981 | Hashimoto | 354/64 |
| 4,293,210 | 10/1981 | Kando | 354/269 |
| 4,329,039 | 5/1982 | Kaneko | 354/266 |

*Primary Examiner*—A. A. Mathews
*Attorney, Agent, or Firm*—Toren, McGeady and Stanger

[57] ABSTRACT

A fixing member having a screw part to be attached to the cable release mounting screw hole of a release button of a camera and a cover member made of an elastic material are unified into one body and are arranged to be attachable to and detachable from the cable release mounting part of the release button.

4 Claims, 3 Drawing Figures

RELEASE OPERATION DEVICE FOR CAMERA

BACKGROUND OF THE INVENTION

1. Field of the Invention

This invention relates to a release operation device of a camera arranged to prevent water from intruding into the inside of the camera.

2. Description of the Prior Art

Generally, the release button of a release operation device of a camera is provided with a mounting hole for mounting a cable release and a fitting hole for the upward and downward motions of the release button. Therefore, when water adheres to the release botton, the water tends to intrude into the inside of the camera through these holes and this has often caused malfunctions. The release operation device of the conventional cameras has been arranged as shown in FIG. 1 of the accompanying drawings. The conventional arrangement as shown in FIG. 1 includes a camera cover 1; a base plate 2 fixedly arranged within the camera; a button base 3 which is secured to the base plate 2 and is provided with a threaded part 3a on the inner side thereof; and a groove part 3b which is arranged in the button base 3 to prevent a release button 6 from rotating. The release button 6 is provided with a tapered screw hole 6a for attaching a cable release thereto; a guide hole 6b which guides a small diameter part 7a of a release rod 7; and a fitting engagement part 6c which fittingly engages a fitting hole 8a of a release button receptacle 8. The release button 6 has a guide plate 9 fixedly attached to the lower end thereof. The fore end of the guide plate 9 engages the groove part 3b of the button base 3 to prevent the release button 6 from rotating. The release button receptacle 8 has a screw part 8b and is fixed with the screw part 8b screwed into the threaded part 3a of the button base 3. The release button receptacle 8 is provided with a fitting engagement part 8c which fittingly engages a lock ring 10. The lock ring 10 is rotatable round the fitting engagement part 8c as shown in the drawing. The release button receptacle 8 is further provided with a void which permits the release button 6 to descend and a counter-sunk part 8d which permits a depressing operation on the release button 6. The lock ring 10 has an operation part 10a for turning it with fingers, a groove part 10b and a protrudent part 10c. The protrudent part 10c is located in a position outside of the descending zone of the guide plate 9 during an ordinary photographing operation to permit the depressing operation on the release button 6. When the camera is not in use, the operation part 10a can be turned with fingers to bring the protrudent part 10c to a position within the descending zone of the guide plate 9 to prevent depression of the release button 6. The cover 1 has a rubber seat 11 attached thereto. A washer 12 which has a lubricated property on the surface thereof is interposed in between the groove part 10b of the lock ring 10 and the seat 11. The seat 11 is constantly pushed by the groove part 10b of the lock ring 10 and is arranged to permit the lock ring 10 to smoothly rotate. A switch seat 14 which is insulative is disposed on a base plate 13. Switching contact pieces 15, 16 and 17 and insulation plates 18 are superposed one on top of another above the base plate 13 as shown and are secured to the plate 13 with screws 19. The switch contact piece 15 abuts on a release rod 7 uplifting the release rod 7, the guide plate 9 and the release button 6. Meanwhile, the switch contact pieces 16 and 17 are connected to known circuits such as a photometric circuit, a release circuit, etc.

With the release button arranged in this manner, when the release button 6 is depressed to effect a release of the camera with the protrudent part 10c of the lock ring 10 located outside of the descending zone of the guide plate 9, the guide plate 9 and the release rod 7 descend together. The switch contact piece 15 first comes into contact with the switch contact piece 16. Then, the switch contact piece 16 comes into contact with the switch contact piece 17. This initiates the known actions of the camera such as a light measuring action and a release action. When water sticks to the cover 1, the water finds no gaps for intrusion into the camera between the groove part 10b of the lock ring 10 and the cover 1 because of the seat 11 and the washer 12. Meanwhile, water enters the cable release mounting screw hole of the release button 6 and gradually enters the inside of the camera through a clearance provided between the release rod part 7a and the guide hole 6b of the release button 6. Further, water which gathers in the counter-sunk part 8d of the release button receptacle 8 also gradually comes into the inside of the camera through a clearance between the fitting engagement part 6c of the release button 6 and the fitting engagement hole 8a of the release button receptacle 8. Besides, it has been confirmed that repeated depression of the release button with water sticking thereto accelerates the intrusion of water through the clearance between the fitting engagement part 6c and hole 8a. Generally, the counter-sunk part 8d of the release button receptacle 8 and the cable release mounting screw hole of the release button 6 are formed into such shapes that water tends to gather therein. With these parts so shaped, a considerable amount of water enters the inside of the camera when the camera is used in the rain. In such a case, the intruding water tends to cause leaks between the switch contact pieces 15, 16 and 17 or it sticks to electrical circuits (not shown) to cause malfunctions of the circuits or it sticks to mechanical parts to cause abnormal operations of the camera due to rusting.

Measures hitherto employed to solve this problem include a method of fitting a rubber O ring to the fitting engagement part and a method of applying oil to the fitting engagement part. However, in the case of the former, the movement of the release button becomes unsatisfactory and the release button incompletely returns to its original position. The latter method gives an inadequate water-proof effect. Besides, the effect attainable by these conventional methods has been varied by inconsistent dimensions of the fitting engagement parts.

SUMMARY OF THE INVENTION

It is a general object of the invention to provide a release operation device for a camera which eliminates the above stated shortcomings of the prior art arrangements by an arrangement wherein a fixing member which is provided with a screw part for attaching it to a cable release mounting screw hole of the release button of the camera and a cover member which is made of an elastic material are arranged into one unified body. With the device of the invention water is prevented from intruding into the camera by detachably mounting this unified body onto the cable release mounting screw hole of the release button of the camera.

The above and further objects and features of the invention will become apparent from the following detailed description of preferred embodiments thereof taken in connection with the accompanying drawings.

DETAILED DESCRIPTION OF PREFERRED EMBODIMENTS

Figure 1:
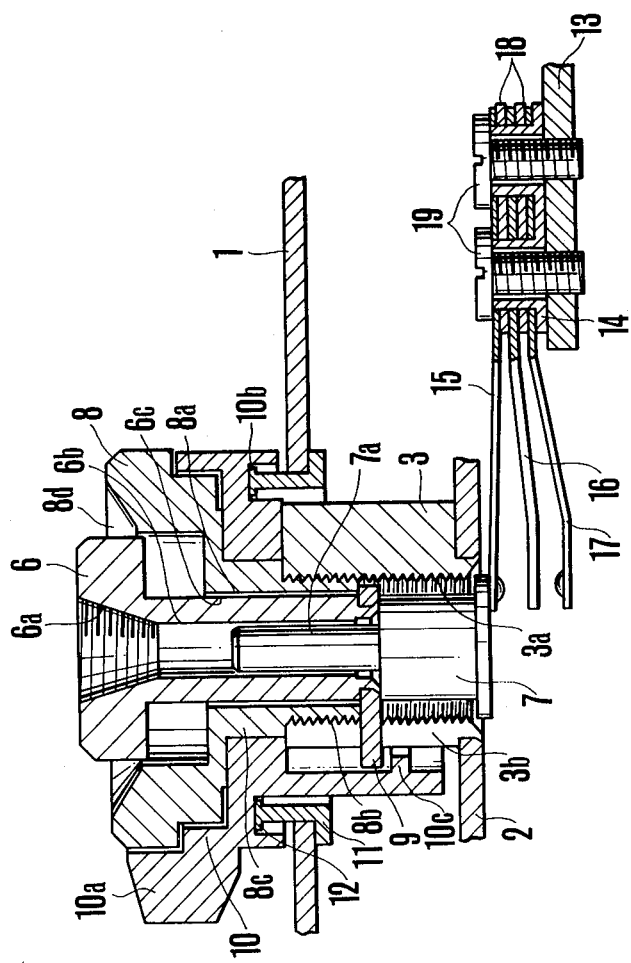
FIG. 1 is a sectional view showing the conventional release operation device described above.
Figure 2:
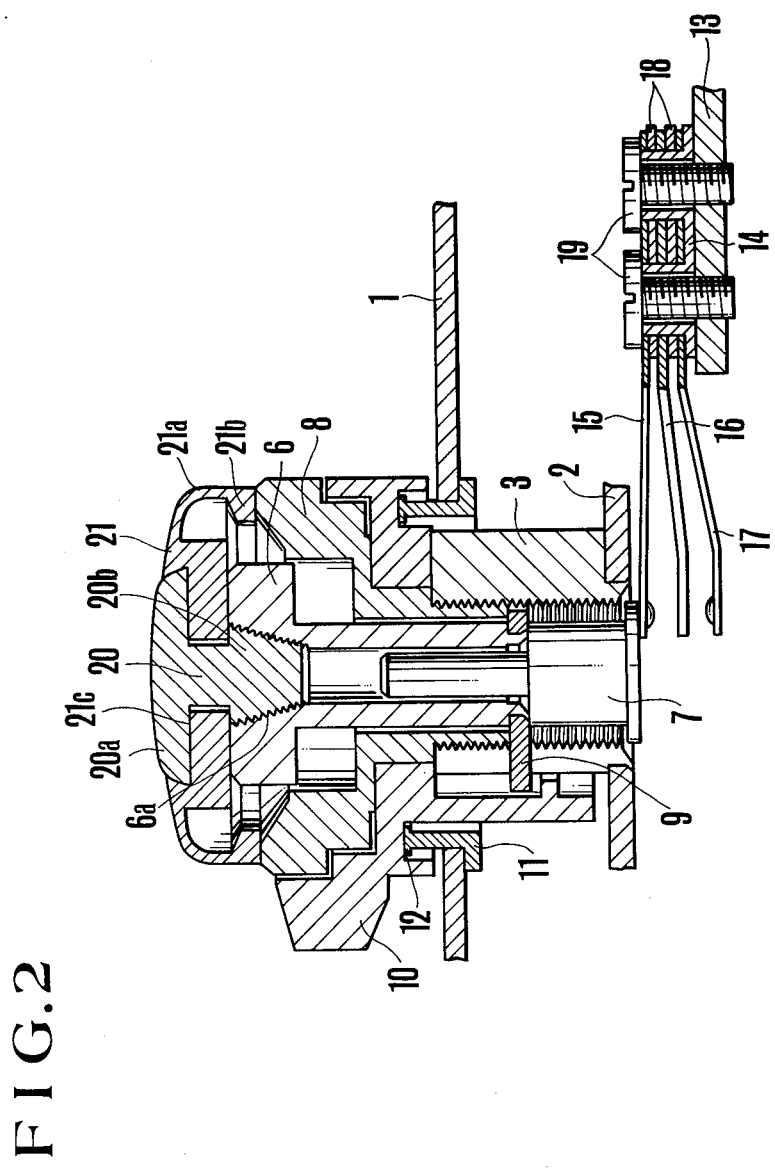
FIG. 2 is a sectional view showing a release operation device as a first embodiment of the invention.

A first embodiment of the invention is arranged as shown in FIG. 2, in which the same parts as those shown in FIG. 1 are indicated with the same reference numerals and these same parts are omitted from the following detailed description.

Referring to FIG. 2, a fixing member 20 has a flange part 20a and a screw part 20b. A cover member 21 is formed with an elastic material such as rubber and has a peripheral part 21a and an end part 21b. The cover member 21 is fitted into a space between the flange part 20a and the screw part 20b of the fixing member with a slight degree of pressure and thus arranged into one unified body with the fixing member 20. An abutting part 21c of the cover member 21 may be cemented to the fixed member 20. This assembly of the fixing member 20 and the cover member 21 is mounted on the release button 6 by screwing the screw part 20b of the fixing member 20 into the cable release mounting screw hole 6a of the release button 6. The cover member 21 has a sufficient height and is so arranged that, under this mounted condition, the end part 21b of the cover member 21 is in tight contact with the release button receptacle 8. The embodiment which is arranged in this manner operates as described below:

When the flange part 20a of the fixing member 20 is depressed with a finger, the release button 6, the guide plate 9 and the release rod 7 descend together. The switching contact pieces 15, 16 and 17 then come into contact with each other in the same manner as in the case of FIG. 1. The camera then begins to perform a light measuring action, a release action, etc. In this instance, the peripheral part 21a of the cover member 21 which is made of an elastic material is readily and flexibly deformed. After completion of the release operation, when the finger is detached from the flange part 20a, the whole structure comes back to the condition as shown in FIG. 2 by virtue of the resilience of the switching contact pieces 15, 16 and 17 and that of the peripheral part 21a of the cover member 21.

Figure 3:
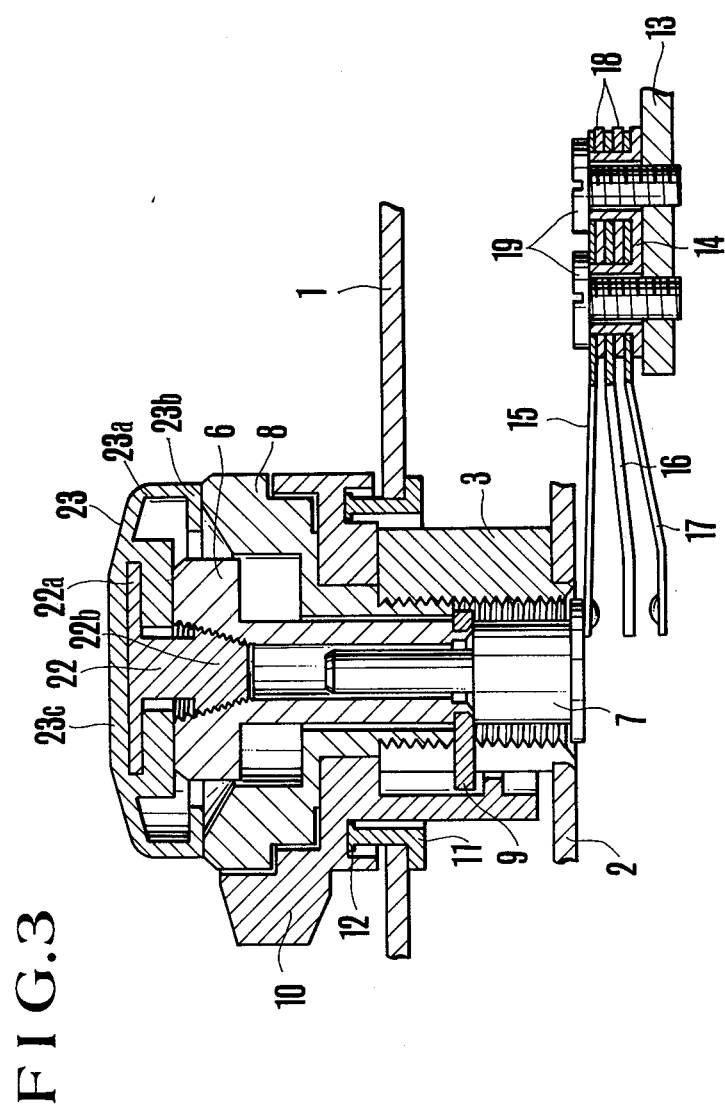
FIG. 3 is a sectional view of a second embodiment of the invention.

A second embodiment of the invention is as shown in FIG. 3. In FIG. 3, the parts of the second embodiment that are identical with the corresponding parts shown in FIG. 1 are indicated with the same reference numerals and the detailed description of them is omitted from the following description. A fixing member 22 has a flange part 22a and a screw part 22b. A cover member 23 which is made of an elastic material such as rubber has a peripheral part 23a, an end part 23b and an upper end part 23c. The flange part 22a of the fixing member 22 is inserted in the inner part of the cover member 23, and the fixing member 22 and the cover member 23 are arranged into one unified body. The assembly of the fixing member 22 and the cover member 23 is mounted on the release button 6 by screwing the screw part 22b of the fixing member 22 into the cable release mounting screw hole 6a of the release button 6 in the same manner as shown in FIG. 2. The height of the cover member 23 is so arranged that, under this mounted condition, the end part 23b of the cover member 23 is completely and tightly in contact with the release button receptacle 8.

When the upper end part 23c of the cover member 23 is depressed with a finger, the release button 6 descends together with the guide plate 9 and the release rod 7 to cause the switching contact pieces 15, 16 and 17 to come into contact with each other in the same manner as in the case of FIG. 1. This initiates the light measuring action, the release action, etc. of the camera. In this instance, the peripheral part 23a of the cover member 23 which is made of the elastic material is readily and flexibly deformed by the depressing operation. When the finger is detached from the upper end part of the cover member after completion of the release action, the whole structure returns to the original condition thereof as shown in FIG. 3 by virtue of the resilience of the switching contact pieces 12, 16 and 17 and that of the peripheral part 23a of the cover member 23.

In accordance with the invented arrangement, the cable release mounting screw hole 6a of the release button 6 and the upper part of the release button receptacle are tightly covered with the cover member which is made of an elastic material such as rubber. Therefore, water never enters the cable release mounting screw hole of the release button and the counter-sunk part of the release button receptacle, so that water can be completely shut out from the inside of the camera. Since the unified assembly of the fixing member and the cover member is arranged to be attachable to and detachable from the release operation device of the camera, it can be mounted only when required. Further, since the cover member is made of an elastic material such as rubber, use of it on the camera seldom causes abnormality in the depressing operation on the release button, etc.

Such being the advantages, the invention enables the photographer to safely use a camera in the rain by virtue of the complete water-proof arrangement around the release button which has been difficult to achieve with the conventional cameras.

While specific embodiments of the invention have been shown and described in detail to illustrate the application of the inventive principles, it will be understood that the invention may be embodied otherwise without departing from such principles.

What we claim:

1. A release operation device for a camera, comprising:
    a release button movable by external operation thereof, said release button having a cable release mounting screw hole;
    a receiving member for receiving said release button, said receiving member having a void part which is provided for movement of the said release button and a counter-sunk part which permits actuation of said release button from outside; and
    a cover member mounted on said mounting screw hole, said cover member being arranged to cover the mounting screw hole and the counter-sunk part to prevent water from entering the inside of the camera through the mounting screw hole and the counter-sunk part, the end part of said cover member being arranged to be in contact with said release button receiving member.

2. A device according to claim 1, wherein said cover member comprises an elastic member and a fixing member having a mounting part which is arranged to be attached to said mounting screw hole.

3. A device according to claim 2, wherein the exterior of said cover member is made entirely of an elastic material.

4. A device according to claim 2, wherein said cover member has a middle part thereof composed of a fixing member and wherein a peripheral part of said cover member is made of an elastic material.

* * * * *